Oct. 24, 1967 HANS-ULRICH KNAUER ET AL 3,349,185

RINGING CURRENT CONVERTING CIRCUIT

Filed March 25, 1964

2 Sheets-Sheet 1

INVENTOR

H. U. KNAUER ~ J. MATTHIEU

BY [signature]

ATTORNEY

INVENTOR
H.U. KNAUER - J. MATTHIEU

BY [signature]
ATTORNEY

United States Patent Office 3,349,185
Patented Oct. 24, 1967

3,349,185
RINGING CURRENT CONVERTING CIRCUIT
Hans-Ulrich Knauer, Kornwestheim, Wurttemburg, and Johannes Matthieu, Stuttgart-Stammheim, Germany, assignors to International Standard Electric Corporation, New York, N.Y., a corporation of Delaware
Filed Mar. 25, 1964, Ser. No. 354,682
Claims priority, application Germany, Apr. 10, 1963, St 20,497
3 Claims. (Cl. 179—16)

ABSTRACT OF THE DISCLOSURE

A ringing converter circuit is inserted between an "intrinsically safe" subscriber station and a telephone office. The converter circuit converts usual ringing currents into acceptable currents. An "intrinsically safe" station is one which cannot receive the usual ringing current—such as an "explosion proof" telephone commonly used in an explosive ladened atmosphere, for example. The invention allows the telephone set to be less expensive, as by an elimination or reduction of massive cast metal housings.

Figure 1A:
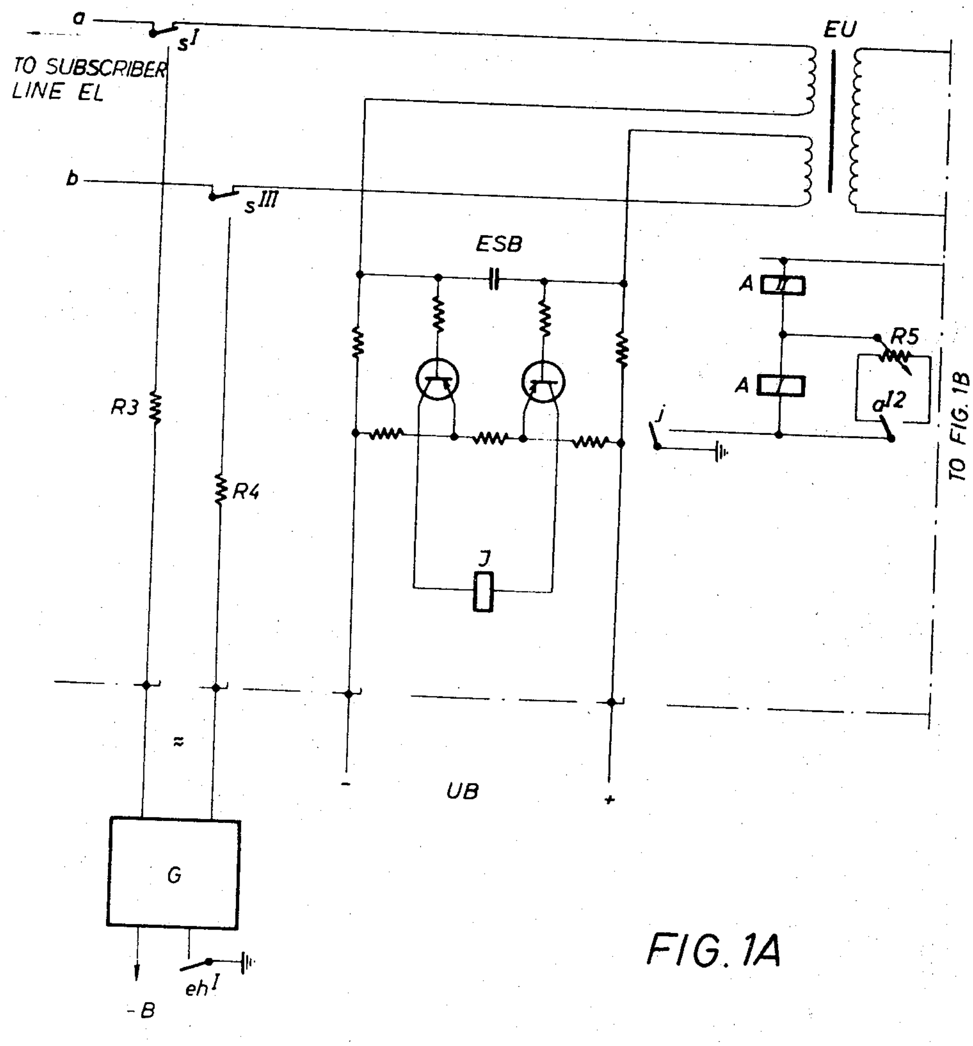

The invention relates to ringing current-converting circuits for use in telephone subscriber line repeaters, and more particularly to circuits for use in systems having intrinsically safe subscriber stations.

In a telephone system, signal devices at subscriber stations are conventionally operated by A.C. ringing current. However, some intrinsically safe subscriber stations—such as those used in areas where explosive gas may accumulate—are not allowed to use a ringing signal with a high voltage. Moreover, it is difficult to ring out on these lines because an intrinsically safe telephone is usually installed in a very noisy place.

Accordingly, an object of the invention is to provide new and improved ringing current converting circuits. Another object is to provide a ringing system for connecting intrinsically safe subscriber stations to conventional telephone systems. Yet another object is to provide a sufficiently intensive ringing sound at the subscriber station to overcome background noise.

According to one aspect of the invention, a subscriber line repeater circuit is arranged so that an A.C. ringing current arriving from a telephone exchange is first converted into an inversion ringing signal and then forwarded to the subscriber station as a voice frequency ringing signal. This way, the terminating line is separated in the subscriber line repeater from the originating line. Due to this kind of separation the high ringing voltages do not appear on the line of an intrinsically safe subscriber station. By the inversion of the ringing signal, a very loud ringing sound is produced at the subscriber station. The ringing frequency which is used can be selected in any well known manner, according to either the requirements of the subscriber line or the properties of the electro-acoustical converter in the subscriber station. It is also possible to have another frequency conversion in the subscriber station.

According to the invention, a further embodiment of the ringing current converter circuit provides means for interrupting the emitted voice frequency ringing signal during the inverted ringing phase. During the intervals of interruption, the line is checked for answer supervision to determine whether the subscriber has answered. The periodical checking on the subscriber's line shortens the ring cut-off time despite a long ringing cycle because the answer supervision signal is sent to the exchange without delay. However, the switch-through connection is delayed in the repeater. Thus, no cross talk is heard on the subscriber line of the intrinsically safe subscriber station, not even if an A.C. ringing signal is emitted by the exchange at the time of switch-through. The connection is established through the line repeater only after it is certain that the exchange has received the subscriber's answer and has switched off the ringing signal.

Figure 1B:
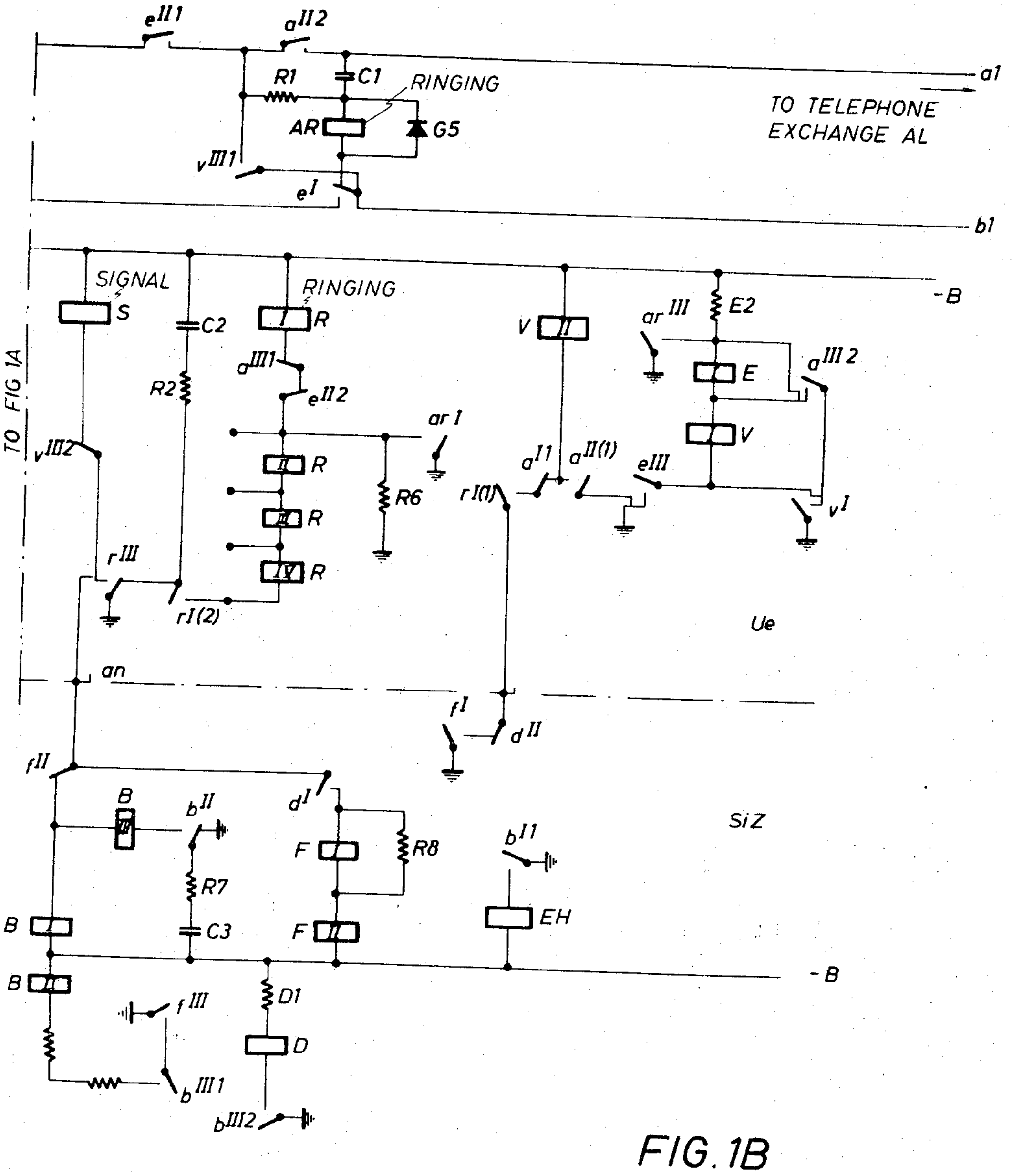

The above mentioned and other features of this invention and the manner of obtaining them will become more apparent, and the invention itself will be best understood by reference to the following description of an embodiment of the invention taken in conjunction with the accompanying drawings, in which:

FIGURES 1A and 1B are a schematic circuit diagram which shows a preferred embodiment of the invention. These two sheets should be placed side by side, in a vertical position, with FIGURE 1A on the left.

The drawing is divided into two parts by a horizontal dot-dashed line. The equipment $U_e$ above the dot-dashed line, is a repeater circuit which is individual to a subscriber line. The equipment SiZ, below the dot-dashed line, is a signal set which is common to many subscriber lines. The subscriber line comprises two conductors *a, b,* which are separated in the repeater by a voice frequency transformer EU. The end EL of the line *a, b,* extends to the subscriber station, and the end AL extends to a central telephone exchange. The common equipment SiZ comprises a ringing signal generator G having an output current which is safe for use in an explosive laden atmosphere. The exact nature of the signal current is not important to the invention.

The remaining components will be understood best by a description of how the circuit operates.

Conventional ringing current, having electrical characteristics which cannot be allowed to enter an explosive atmosphere, is received from the telephone exchange over line AL. Responsive thereto, an A.C. relay AR operates over a circuit traced from conductor *a*1, through capacitor C1, relay AR, and contacts $e^{I}$ to conductor $b^{1}$. This operation closes contacts $ar^{I}$ to complete a circuit from ground through contacts $e^{II2}$, $a^{III1}$, and the I winding of relay R to (—) B battery. Contacts $ar^{III}$ close without immediate effect.

Break contacts $r^{III}$ open and make contacts $r^{I(2)}$ close to cause charged capacitor C2 to discharge through windings II, III, IV of relay R for establishing a minimum holding period for this relay. For example, the relay AR may have a cycle of one second "on" and three seconds "off" while the relay R may have a cycle of three-and-one-half seconds on and a half second off. The taps between the R relay windings II, III, IV provide for selection of the duration of the on part of a time interval. The cycle of relay R may, therefore, be selected to provide extra long ringing sound for extremely noisy locations.

In their operated position, contacts $r^{III}$ close circuits for applying ground potential through contacts $v^{III2}$, and relay S to battery (—) B, and through contacts $f^{II}$ and winding I of relay B to battery (—) B. Both relays S and B operate. Contacts $r^{I(1)}$, close without immediate effect.

Responsive to the operation of relay S, contacts $s^{I}$ and $s^{III}$ operate to connect the ringing current generator G to and disconnect transformer EU from the subscriber end EL of line *a, b.*

When relay B operates, contacts $b^{II}$ close to connect charged capacitor C3 to winding $B^{III}$ but the capacitor does not discharge because the other end of winding B is connected to ground at contacts $r^{III}$. Contacts $B^{II}$ close to operate relay EH, and contacts $b^{III2}$ close to operate relay D, both operations being over obvious circuits.

Relay EH closes contacts $eh^{I}$ to energize the generator G and send the ringing signal current over the subscriber line EL.

Relay D closes contacts $d^{I}$ to operate relay F from ground at operated contacts $r^{III}$. Contacts $d^{II}$ open without immediate effect.

When relay F operates, the contacts $f^{III}$ close without a circuit operational purpose—the associated resistors are selected to give a small counter energization which serves as a fine adjustment of operate and release time for the relay B. Contacts $f^{I}$ close, but contacts $d^{II}$ are open. Contacts $f^{II}$ open, and capacitor C3 begins to discharge through windings BI, BIII to slow the release of relay B.

Means are provided for testing the line after each ringing period to determine whether the called party has answered. In greater detail, after relay B drops, contacts $B^{III2}$ open to restore relay D and, in turn, close contacts $d^{II}$. A circuit is now closed to test the called line for answer supervision. That is, ground potential is applied through contacts $f^{I}$, $d^{II}$, $r^{I(1)}$, $a^{I1}$, and the winding $V^{II}$, to battery (−) B. Relay V operates and opens contacts $v^{III2}$ to release relay S and thereby return contacts $S^{I}$ and $S^{III}$ to normal.

If the called subscribed has not answered, there is no bridge across conductors *a, b* of line EL, and relay J cannot operate. An instant later, slow-release relay F releases because contacts $d^{I}$ are now open. This opens contacts $f^{I}$ and releases relay V.

On the other hand, if the called subscribed has answered, his hookswich has bridged conductors *a, b,* and relay J does operate. Contacts *j* close and operate relay A. This, in turn, closes contacts $a^{II(1)}$ to hold relay V after contacts $a^{I1}$ open. Contacts $a^{II2}$ close to extend part of the talking circuit over conductor AL to the telephone exchange. Contacts $a^{III1}$ open to break the original operate path to relay R so that it is held only by the current from the discharging capacitor C2. Relay E operates through contacts $a^{III2}$ to ground at contacts $v^{I}$.

Means are provided for delaying switch through after the receipt of answer supervision to keep the called party from hearing ringing current. Responsive to the operation of relay E, contacts $e^{III}$ operate to release relay V (contacts $a^{I1}$ being open at this time), contacts $e^{I}$, and $e^{II1}$ close to complete the talking circuit to line AL. The delay period extending from closure of contacts $a^{II2}$ to closure of contacts $e^{I}$ and $e^{II1}$ keeps the called party from hearing ringing current. Contacts $e^{II2}$ break another point in the operate circuit to relay R.

When capacitor C2 discharges sufficiently, relay R times out and releases. The circuit returns to the starting condition. If the called subscriber has answered, there is no further effect. If not, the cycle repeats when the ringing current is next received over line AL.

While the principles of the invention have been described above in connection with specific apparatus and applications, it is to be understood that this description is made only by way of example and not as a limitation on the scope of the invention.

We claim:

1. A telephone signaling system comprising a subscriber line repeater circuit extending from an intrinsically safe subscriber station to a telephone exchange, means in said line for transmitting A.C. signals which are not safe for use in the area of said station between said station and exchange while separating said station and said exchange with respect to direct current, said signals being transmitted over the extended period of time beginning with a seizure of said called line and ending with either an answer of the call by the called party or an abandonment of the call by the calling party, a ringing signal generator having an output current which is safe for use in the area of said station, means comprising an A.C. relay in said repeater operated responsive to a receipt of ringing current from said exchange for sending said output current to said station throughout said extended period of time, and means for applying said output current to the line leading to said station with a cycle selected to provide extra long ringing for causing sound in extremely noisy locations.

2. The system of claim 1 and means for periodically interrupting said output current, and means effective during said interruption for testing the line to determine whether the called party has answered.

3. The system of claim 1 and means for delaying switch through after the receipt of answer supervision to keep the called party from hearing ringing current.

References Cited

UNITED STATES PATENTS 3,156,775 11/1964 Ioakimidis et al. ---- 179—16.45

KATHLEEN H. CLAFFY, *Primary Examiner.*

H. ZELLER, *Assistant Examiner.*